(12) United States Patent
Sasaki et al.

(10) Patent No.: US 10,985,402 B2
(45) Date of Patent: *Apr. 20, 2021

(54) BATTERY

(71) Applicant: PANASONIC INTELLECTUAL PROPERTY MANAGEMENT CO., LTD., Osaka (JP)

(72) Inventors: Izuru Sasaki, Kyoto (JP); Junichi Hibino, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 106 days.

This patent is subject to a terminal disclaimer.

(21) Appl. No.: 16/294,293

(22) Filed: Mar. 6, 2019

(65) Prior Publication Data

US 2019/0198922 A1    Jun. 27, 2019

Related U.S. Application Data

(63) Continuation of application No. 15/073,597, filed on Mar. 17, 2016, now Pat. No. 10,270,125.

(30) Foreign Application Priority Data

Apr. 27, 2015 (JP) .................................. 2015-090147
Sep. 1, 2015 (JP) .................................. 2015-171628

(51) Int. Cl.
*H01M 10/0562* (2010.01)
*H01M 10/0585* (2010.01)
(Continued)

(52) U.S. Cl.
CPC ....... *H01M 10/0562* (2013.01); *H01M 4/667* (2013.01); *H01M 10/0445* (2013.01);
(Continued)

(58) Field of Classification Search
CPC ......... H01M 10/0525; H01M 10/0562; H01M 10/0585; H01M 10/482
See application file for complete search history.

(56) References Cited

U.S. PATENT DOCUMENTS

2004/0161667 A1    8/2004    Fukuzawa et al.
2004/0185334 A1    9/2004    Iwamoto
(Continued)

FOREIGN PATENT DOCUMENTS

CN    1523703 A    8/2004
CN    101276940 A    10/2008
(Continued)

OTHER PUBLICATIONS

English Translation of Chinese Search Report from State Intellectual Property Office (SIPO) of the People's Republic of China dated Sep. 25, 2019 for the related Chinese Patent Application No. 201510969309.6.
(Continued)

*Primary Examiner* — Osei K Amponsah
(74) *Attorney, Agent, or Firm* — Greenblum & Bernstein, P.L.C.

(57) ABSTRACT

A battery includes a first positive electrode collector, a first negative electrode collector, a first power generating element, a second power generating element, and a first insulating part. The first and second power generating elements each include a positive electrode active material-containing layer, a negative electrode active material-containing layer, and an inorganic solid electrolyte-containing layer. In each of the first and second power generating elements, the inorganic solid electrolyte layer is in contact with the positive electrode active material-containing layer and the negative electrode active material-containing layer. The positive electrode active material layers of the first and second power generating elements are in contact with the
(Continued)

first positive electrode collector. The negative electrode active material layers of the first and second power generating elements are in indirect contact with the first negative electrode collector. The first insulating part is disposed between the first and second power generating elements.

7 Claims, 11 Drawing Sheets

(51) Int. Cl.
*H01M 10/48* (2006.01)
*H01M 10/0525* (2010.01)
*H01M 4/66* (2006.01)
*H01M 10/04* (2006.01)
*H01M 10/052* (2010.01)
*H01M 10/42* (2006.01)
*H01M 2/34* (2006.01)

(52) U.S. Cl.
CPC ..... *H01M 10/052* (2013.01); *H01M 10/0585* (2013.01); *H01M 10/4207* (2013.01); *H01M 2/348* (2013.01); *H01M 2200/106* (2013.01); *H01M 2300/0068* (2013.01)

(56) References Cited

U.S. PATENT DOCUMENTS

| | | |
|---|---|---|
| 2008/0241684 A1 | 10/2008 | Muraoka et al. |
| 2011/0014520 A1 | 1/2011 | Ueda |
| 2012/0094176 A1* | 4/2012 | Neumann ............ H01M 4/366 |
| | | 429/211 |

FOREIGN PATENT DOCUMENTS

| | | |
|---|---|---|
| CN | 101997144 A | 3/2011 |
| EP | 1460701 | 9/2004 |
| JP | 2000-195482 | 7/2000 |
| JP | 2001-015153 | 1/2001 |
| JP | 2002-216846 | 8/2002 |
| JP | 2004-253168 A | 9/2004 |
| JP | 2005-011660 | 1/2005 |
| JP | 2008-243708 A | 10/2008 |
| JP | 2012-054152 A | 3/2012 |
| WO | 2010/010717 A1 | 1/2010 |

OTHER PUBLICATIONS

English Translation of Chinese Search Report from the Patent Office of the People's Republic of China dated Jan. 15, 2020 for the related Chinese Patent Application No. 201510969309.6.
The Extended European Search Report dated Jun. 2, 2016 for the related European Patent Application No. 16160444.2.

* cited by examiner

BATTERY

This is a continuation application of U.S. patent application Ser. No. 15/073,597, filed Mar. 17, 2016, which claims priority to Japanese Patent Application No. 2015-171628, filed Sep. 1, 2015 and Japanese Patent Application No. 2015-090147, filed Apr. 27, 2015. The disclosures of these documents, including the specifications, drawings, and claims, are incorporated herein by reference in their entirety.

BACKGROUND

1. Technical Field

The present disclosure relates to a battery.

2. Description of the Related Art

Japanese Unexamined Patent Application Publication No. 2002-216846 discloses a sheet battery composed of a plurality of internal electrode assemblies electrically connected to one another through current collector connecting portions.

SUMMARY

One non-limiting and exemplary embodiment provides a battery having high reliability, which has been demanded in known techniques.

In one general aspect, the techniques disclosed here feature a battery including a first positive electrode collector, a first negative electrode collector, a first power generating element, a second power generating element, and a first insulating part. The first power generating element and the second power generating element each include a positive electrode active material layer containing a positive electrode active material, a negative electrode active material layer containing a negative electrode active material, and an inorganic solid electrolyte layer containing an inorganic solid electrolyte. In each of the first power generating element and the second power generating element, the inorganic solid electrolyte layer is in contact with both the positive electrode active material layer and the negative electrode active material layer. The positive electrode active material layer of the first power generating element and the positive electrode active material layer of the second power generating element are in contact with the first positive electrode collector. The negative electrode active material layer of the first power generating element and the negative electrode active material layer of the second power generating element are in contact with the first negative electrode collector. The first insulating part is disposed between the first power generating element and the second power generating element.

The present disclosure can achieve a battery having high reliability.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

The Embodiments will now be described with reference to the drawings.

Embodiment 1

Figure 1:
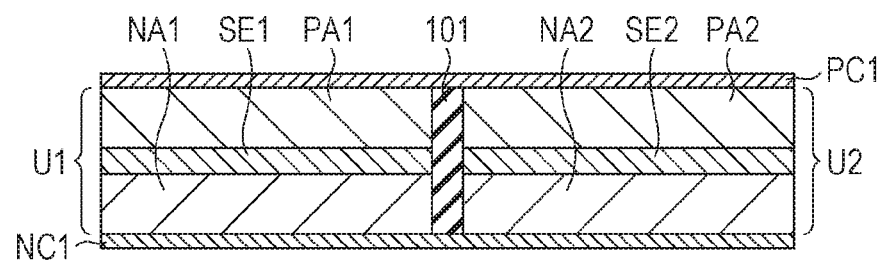
FIG. 1 is a diagram illustrating the schematic configuration of a battery according to Embodiment 1.

FIG. 1 is a diagram (cross-sectional view) illustrating the schematic configuration of a battery 1000 according to Embodiment 1.

The battery 1000 in Embodiment 1 includes a first positive electrode collector PC1, a first negative electrode collector NC1, a first power generating element U1, a second power generating element U2, and a first insulating part 101.

The first power generating element U1 includes a positive electrode active material layer PA1, a negative electrode active material layer NA1, and an inorganic solid electrolyte layer SE1.

In the first power generating element U1, the inorganic solid electrolyte layer SE1 is in contact with the positive electrode active material layer PA1 and the negative electrode active material layer NA1.

The second power generating element U2 includes a positive electrode active material layer PA2, a negative electrode active material layer NA2, and an inorganic solid electrolyte layer SE2.

In the second power generating element U2, the inorganic solid electrolyte layer SE2 is in contact with the positive electrode active material layer PA2 and the negative electrode active material layer NA2.

The positive electrode active material layer PA1 of the first power generating element U1 and the positive electrode active material layer PA2 of the second power generating element U2 are in contact with the first positive electrode collector PC1.

The negative electrode active material layer NA1 of the first power generating element U1 and the negative electrode active material layer NA2 of the second power generating element U2 are in contact with the first negative electrode collector NC1.

The first insulating part 101 is disposed between the first power generating element U1 and the second power generating element U2.

The configuration described above can prevent the influence of a damage occurred in one power generating element from propagating to another power generating element.

For example, if a shock or vibration applied to a battery causes a damage (e.g., cracking or breakage) in a part of the power generating elements, the first insulating part functions as a partition wall. That is, the first insulating part prevents the damage from penetrating to the adjacent power generating element. As a result, the expansion of the damaged portion can be prevented, and undamaged power generating elements normally function, for example, even if the damaged power generating element loses its function of generating power. Consequently, the battery can maintain the power generating function.

In addition, since the member containing the inorganic solid electrolyte is highly brittle, cracking or breakage readily occurs in the member containing the inorganic solid electrolyte. Accordingly, in the configuration of Embodiment 1, adjacent power generating elements are physically separated from each other with the first insulating part. Consequently, the material (e.g., active material powder) exfoliated from the damaged power generating element is prevented from coming into contact with the adjacent undamaged power generating element. That is, the adjacent power generating element can be prevented from a short circuit due to adhesion of the exfoliated material.

A battery is probably damaged when the battery is dropped during the manufacturing, transporting, or use thereof or is probably damaged by the vibration or shock involved in handling of the battery or the stress or deformation due to expansion and contraction of the active materials of the battery by the charge and discharge. In the damaged portion, for example, the internal resistance is significantly increased to block the flow of ions or electrons. As a result, the characteristics of the battery decrease. If the damage is terrific, the power generating function of the battery may be lost.

Against such damages, the configuration of Embodiment 1 can prevent the characteristics of the battery from being decreased and the power generating function from being lost, even if a part of the power generating elements is damaged. Consequently, a battery having a long service life and high reliability can be achieved.

Figure 2:
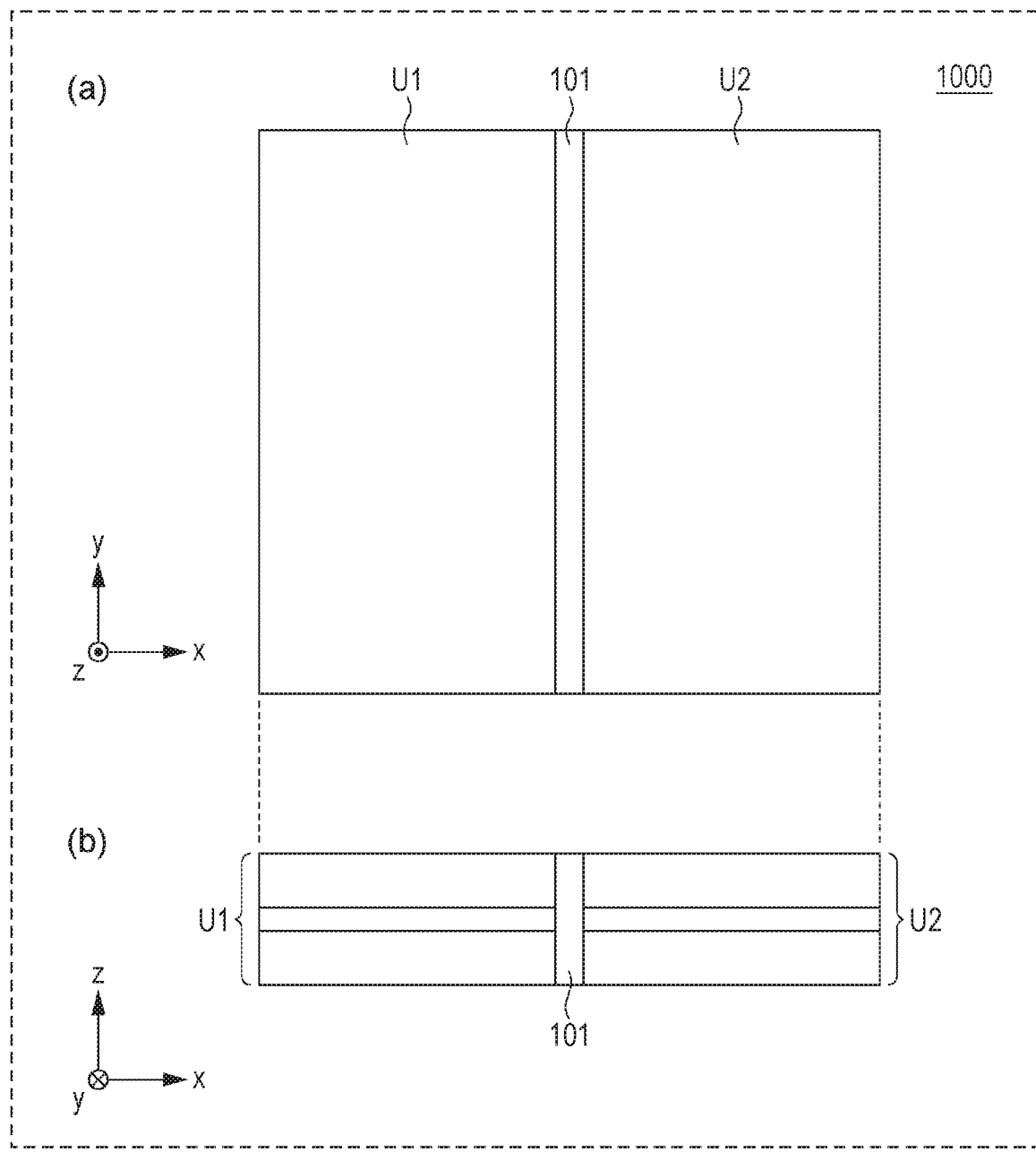
FIG. 2 includes diagrams illustrating the schematic configurations of the top surface and the side surface of the battery according to Embodiment 1.

FIG. 2 includes diagrams illustrating the schematic configurations of the top and side surfaces of the battery 1000 according to Embodiment 1.

In the example shown in FIG. 2, the first insulating part 101 is disposed along the y-direction.

The first insulating part 101 may be disposed in an oblique direction so as to extend also in the x-direction on the xy-plane.

As shown in FIGS. 1 and 2, the first insulating part 101 may be disposed such that the gap between the first power generating element U1 and the second power generating element U2 is densely filled with the first insulating part 101.

Figure 3:
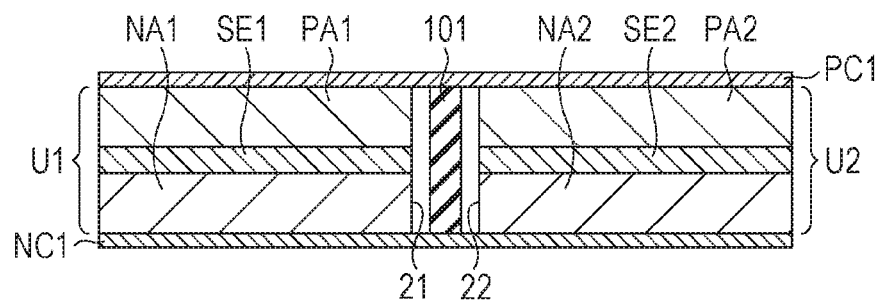
FIG. 3 is a diagram illustrating the schematic configuration of a modification example, battery, according to Embodiment 1.

FIG. 3 is a diagram illustrating the schematic configuration of a modification example, battery 1100, according to Embodiment 1.

As in the battery 1100 shown in FIG. 3, a first void 21 may be disposed between the first insulating part 101 and the first power generating element U1.

In addition, as in the battery 1100 shown in FIG. 3, a second void 22 may be disposed between the first insulating part 101 and the second power generating element U2.

Alternatively, in the configuration of Embodiment 1, only one of the first void 21 and the second void 22 may be disposed.

Figure 4:
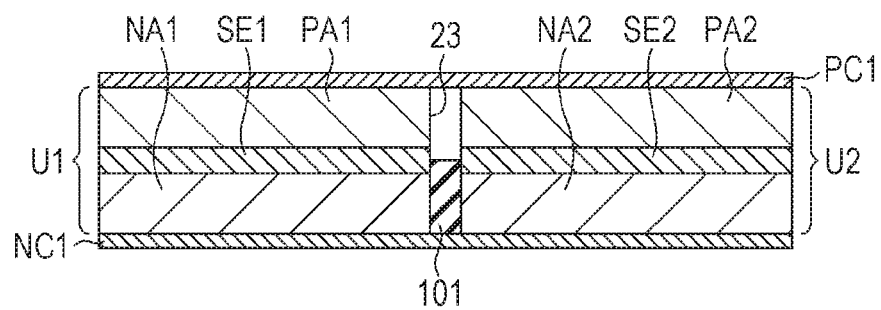
FIG. 4 is a diagram illustrating the schematic configuration of another modification example, battery, according to Embodiment 1.

FIG. 4 is a diagram illustrating the schematic configuration of another modification example, battery 1200, according to Embodiment 1.

As in the battery 1200 shown in FIG. 4, the first insulating part 101 may be disposed so as to cover the negative electrode active material layer NA1 and the negative electrode active material layer NA2 and not to cover the positive electrode active material layer PA1 and the positive electrode active material layer PA2. In such a case, a void 23 may be disposed.

Figure 5:
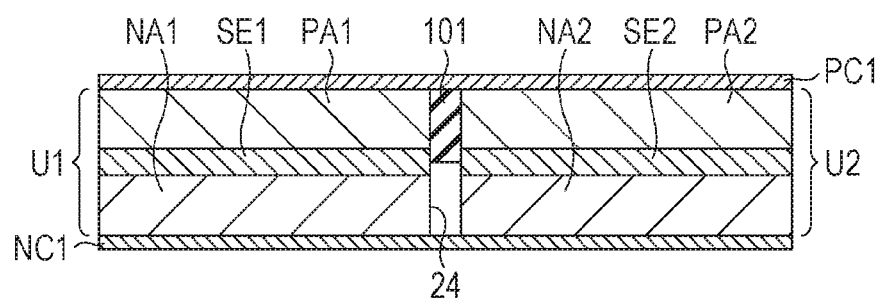
FIG. 5 is a diagram illustrating the schematic configuration of another modification example, battery, according to Embodiment 1.

FIG. 5 is a diagram illustrating the schematic configuration of another modification example, battery 1300, according to Embodiment 1.

As in the battery 1300 shown in FIG. 5, the first insulating part 101 may be disposed so as to cover the positive electrode active material layer PA1 and the positive electrode active material layer PA2 and not to cover the negative electrode active material layer NA1 and the negative electrode active material layer NA2. In such a case, a void 24 may be disposed.

As shown in FIGS. 1 to 5, the first insulating part 101 may be disposed in any manner such that the positive electrode active material layer of one power generating element and the negative electrode active material layer of adjacent another power generating element are physically separated from each other with the first insulating part 101.

Figure 6:
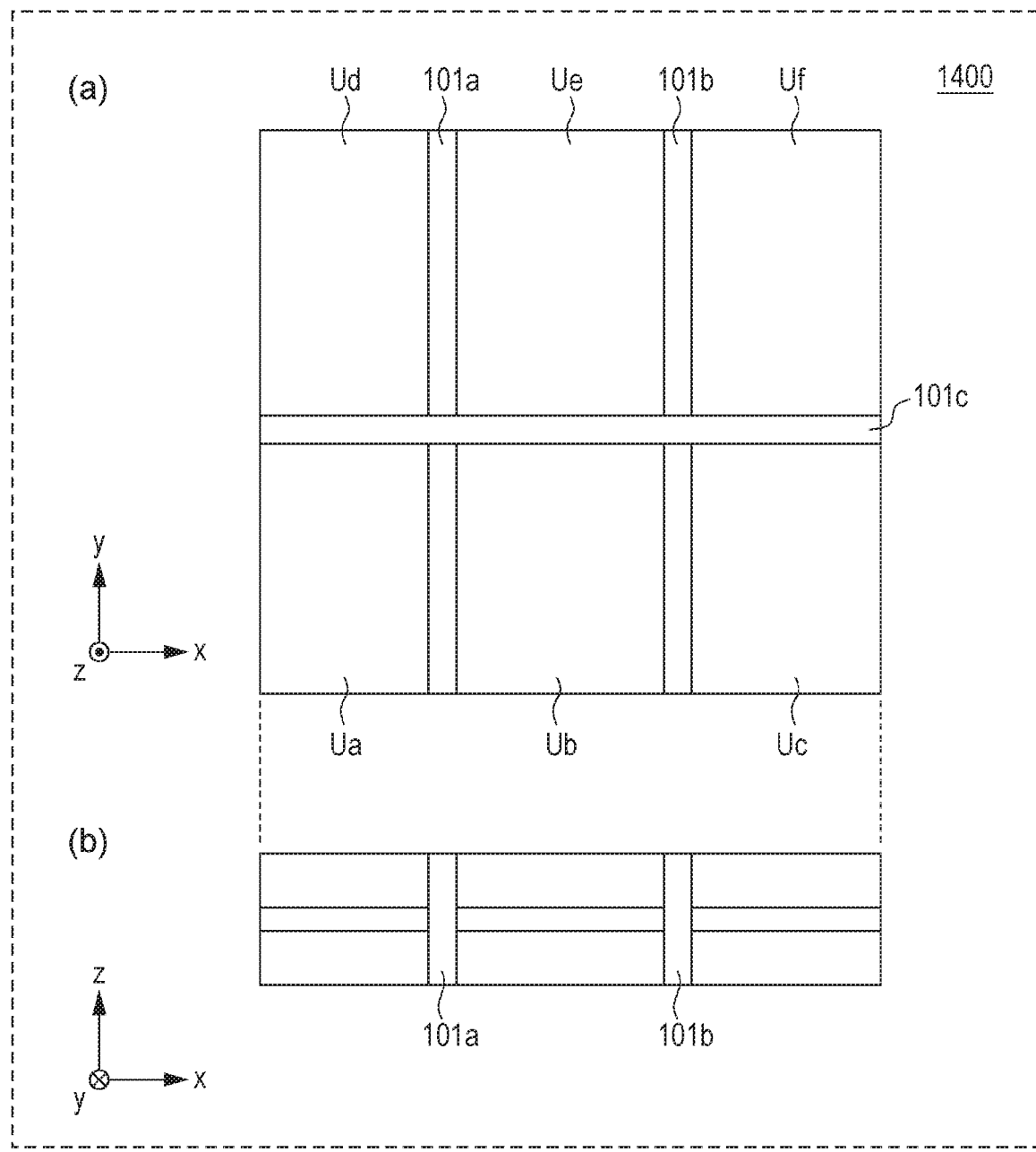
FIG. 6 includes diagrams illustrating the schematic configurations of the top surface and the side surface of another modification example, battery, according to Embodiment 1.

FIG. 6 includes diagrams illustrating the schematic configurations of the top and side surfaces of the battery 1400 according to Embodiment 1.

As shown in FIG. 6, the battery 1400 may include power generating elements Ua, Ub, Uc, Ud, Ue, and Uf.

In addition, as shown in FIG. 6, the battery 1400 may include insulating parts 101a, 101b, and 101c each disposed between a pair of adjacent power generating elements.

In Embodiment 1, the number of the power generating elements may be two or more.

In Embodiment 1, the positions and the directions of the insulating parts may be uniformly arranged in the vertical direction (y-direction) or the horizontal direction (x-direction) with respect to the faces of the power generating elements. Such a configuration makes the manufacturing easy.

In an all-solid-state lithium secondary battery for a portable electronic device, such as a smartphone or a digital camera, the total area of the principal surfaces of the power generating elements may be 1 to 100 $cm^2$.

Alternatively, in an all-solid-state lithium secondary battery as a power source for a large mobile apparatus, such as an electric vehicle, the total area of the principal surfaces of the power generating elements may be 100 to 1000 $cm^2$.

The inorganic solid electrolyte layer contains an inorganic solid electrolyte.

Usable examples of the inorganic solid electrolyte include oxide solid electrolytes and sulfide solid electrolytes.

Usable examples of the oxide solid electrolyte include NASICON solid electrolytes represented by $LiTi_2(PO_4)_3$ and element substituted products thereof; $(LaLi)TiO_3$-based perovskite solid electrolytes; LISICON solid electrolytes represented by $Li_{14}ZnGe_4O_{16}$, $Li_4SiO_4$, and $LiGeO_4$ and element substituted products thereof; garnet solid electrolytes represented by $Li_7La_3Zr_2O_{12}$ and element substituted products thereof; $Li_3N$ and H-substituted products thereof; and $Li_3PO_4$ and N-substituted products thereof.

Usable examples of the sulfide solid electrolyte include $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$. These electrolytes may be mixed with, for example, LiX (X: F, Cl, Br, or I), $MO_y$, or $Li_xMO_y$ (M: P, Si, Ge, B, Al, Ga, or In) (x, y: each natural number). $Li_2S$—$P_2S_5$ has a high ionic conductivity and is hardly reduced at a low potential. The use of $Li_2S$—$P_2S_5$ therefore makes the construction of a battery easy.

The inorganic solid electrolyte may have a thickness of 1 to 100 μm. A thickness of the inorganic solid electrolyte of less than 1 μm increases the risk of causing a short circuit between the positive electrode active material layer and the negative electrode active material layer. A thickness of the inorganic solid electrolyte of larger than 100 μm may make a high output operation difficult.

The positive electrode active material layer contains a positive electrode active material. The positive electrode active material layer may be a positive electrode mixture layer containing a positive electrode active material and an inorganic solid electrolyte. The positive electrode active material layer may contain a conductive assistant for reducing the electrode resistance. The positive electrode active material layer may contain a binding agent for improving the binding ability between positive electrode active material particles or the binding ability between the positive electrode mixture layer and a current collector.

The positive electrode mixture layer may have a thickness of 10 to 500 μm. A thickness of the positive electrode mixture layer of less than 10 μm may make the achievement of a sufficient energy density of the battery difficult. A thickness of the positive electrode mixture layer of larger than 500 μm may make a high output operation difficult.

The positive electrode active material may be, for example, a material that occludes and releases metal ions. The positive electrode active material may be, for example, a material that occludes and release lithium ions. Usable examples of the positive electrode active material include lithium-containing transition metal oxides, transition-metal fluorides, polyanion and fluorinated polyanion materials, and transition-metal sulfides. Use of a lithium ion-containing transition metal oxide can reduce the manufacturing cost and increase the average discharge voltage.

The negative electrode active material layer contains a negative electrode active material. The negative electrode active material layer may be a negative electrode mixture layer containing a negative electrode active material and an inorganic solid electrolyte. The negative electrode active material layer may contain a conductive assistant for reducing the electrode resistance. The negative electrode active material layer may contain a binding agent for improving the binding ability between negative electrode active material particles or the binding ability between the negative electrode mixture layer and a current collector.

The negative electrode mixture layer may have a thickness of 10 to 500 μm. A thickness of the negative electrode mixture layer of less than 10 μm may make the achievement of a sufficient energy density of the battery difficult. A thickness of the negative electrode mixture layer of larger than 500 μm may make a high output operation difficult.

The negative electrode mixture layer may have a thickness larger than that of the positive electrode mixture layer. Such a configuration can reduce the load applied to the negative electrode to prolong the service life of the battery.

The negative electrode active material may be, for example, a material that occludes and releases metal ions. The negative electrode active material may be, for example, a material that occludes and release lithium ions. Usable examples of the negative electrode active material include lithium metal, metals or alloys alloying with lithium, carbon materials, transition metal oxides, and transition metal sulfides. Usable examples of the carbon material include graphite and non-graphite carbon materials, such as hard carbon and coke. Usable examples of the transition metal oxide include CuO and NiO. Usable examples of the transition metal sulfide include copper sulfide denoted by CuS. Usable examples of the metal or alloy alloying with lithium include silicon compounds, tin compounds, and alloys of aluminum compounds and lithium. Use of the carbon material can reduce the manufacturing cost and increase the average discharge voltage.

Usable examples of the conductive assistant include graphites, such as natural graphite and artificial graphite; carbon blacks, such as acetylene black and Ketjen black; conductive fibers, such as carbon fibers and metal fibers; carbon fluoride; metal powders, such as aluminum powders; conductive whiskers, such as zinc oxide and potassium titanate; conductive metal oxides, such as titanium oxide; and conductive polymers, such as polyanion, polypyrrole, and polythiophene. Use of the carbon conductive assistant can reduce the cost.

Usable examples of the binding agent include polyvinylidene fluoride, polytetrafluoroethylene, polyethylene, polyacrylonitrile, hexafluoropolypropylene, styrene-butadiene rubber, and carboxymethyl cellulose.

Usable examples of the positive electrode collector include porous or non-porous sheets or films made of metal materials, such as aluminum, stainless steel, titanium, and alloys thereof. Aluminum and alloys thereof are inexpensive and can be readily formed into thin films. The sheets or films may be, for example, metal foil or mesh.

The positive electrode collector may have a thickness of 1 to 30 μm. A thickness of the positive electrode collector of less than 1 μm is insufficient in mechanical strength and readily causes cracking or breakage in the current collector. A thickness of the positive electrode collector of larger than 30 μm has a risk of reducing the energy density of the battery.

Usable examples of the negative electrode collector include porous or non-porous sheets or films made of metal materials, such as stainless steel, nickel, copper, and alloys thereof. Copper and alloys thereof are inexpensive and can be readily formed into thin films. The sheets or films may be, for example, metal foil or mesh.

The negative electrode collector may have a thickness of 1 to 30 μm. A thickness of the negative electrode collector of less than 1 μm is insufficient in mechanical strength and readily causes cracking or breakage in the current collector.

A thickness of the negative electrode collector of larger than 30 µm has a risk of reducing the energy density of the battery.

The insulating part may be, for example, a member containing an insulating material.

The insulating material may be, for example, an inorganic insulating material. Usable examples of the inorganic insulating material include simple oxides, such as $SiO_2$, MgO, $Al_2O_3$, and $ZrO_2$; complex oxides containing two or more simple oxides; metal nitrides, such as AlN and $Si_3N_4$; and metal carbides, such as SiC.

Alternatively, the insulating material may be, for example, an organic insulating material. Usable examples of the organic insulating material include organic polymers, such as polyvinylidene fluoride, polytetrafluoroethylene, polyethylene, polypropylene, aramid resin, polyamide, polyimide, polyamidoimide, polyacrylonitrile, polyacrylic acid, polyacrylic acid methyl ester, polyacrylic acid ethyl ester, polyacrylic acid hexyl ester, polymethacrylic acid, polymethacrylic acid methyl ester, polymethacrylic acid ethyl ester, polymethacrylic acid hexyl ester, polyvinyl acetate, polyvinylpyrrolidone, polyether, polyether sulfone, hexafluoropolypropylene, and carboxymethyl cellulose. Alternatively, the organic insulating material may be rubber, such as silicone rubber, chloroprene rubber, nitrile butadiene rubber, ethylene propylene rubber, chlorosulfonated polyethylene rubber, acrylic rubber, urethane rubber, fluororubber, polysulfide rubber, natural rubber, isoprene rubber, styrene-butadiene rubber, butyl rubber, and butadiene rubber.

The insulating part may have a width (thickness in the x-direction) of 1 to 10000 µm. A width of the insulating part of less than 1 µm may complicate the manufacturing thereof, whereas a width of the insulating part of larger than 10000 µm may reduce the energy density of the battery.

The insulating part may have a Young's modulus of 20 GPa or less. The positive electrode mixture layer, inorganic solid electrolyte layer, and negative electrode mixture layer constituting a power generating element each have a Young's modulus of larger than about 20 GPa. Accordingly, the insulating part having a Young's modulus less than those of these layers and disposed between adjacent power generating elements can better function as a partition wall that prevents the damage occurred in a part of the power generating elements from penetrating to the adjacent power generating element. That is, stress or deformation occurred in a power generating element can be relieved by the insulating part having a low Young's modulus.

Method of Production

An example of a method for producing a battery according to Embodiment 1 will now be described.

Figure 7:
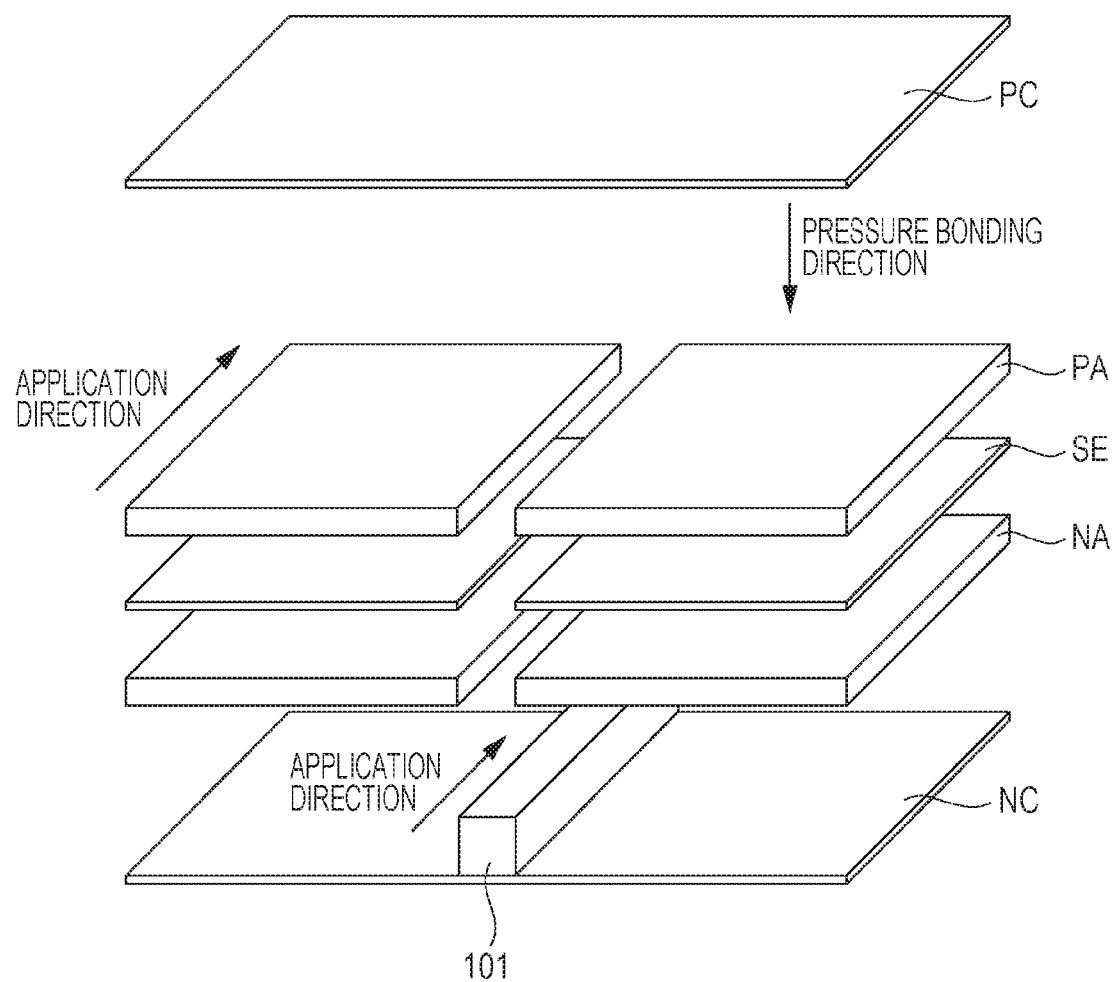
FIG. 7 is a diagram explaining a method for producing a battery according to Embodiment 1.

FIG. 7 is a diagram explaining a method for producing a battery according to Embodiment 1.

The method for producing a battery according to Embodiment 1 includes steps A1, A2, A3, A4, and A5.

In step A1, a paste (insulating part 101) prepared by adding a solvent to an insulating material is applied onto a negative electrode collector NC.

In step A2, which is performed after step 1, a paste prepared by adding a solvent to a negative electrode active material is applied onto the negative electrode collector NC in a strip form with a slit die according to the width of the applied insulating material to form a negative electrode active material layer NA.

In step A3, which is performed after step A2, a paste prepared by adding a solvent to an inorganic solid electrolyte is applied onto the negative electrode active material layer NA in a strip form to form an inorganic solid electrolyte layer SE. The width of each strip is adjusted to that of the underlying negative electrode active material layer NA.

In step A4, which is performed after step A3, a paste prepared by adding a solvent to a positive electrode active material is applied onto the inorganic solid electrolyte layer SE in a strip form to form a positive electrode active material layer PA. The width of each strip is adjusted to that of the underlying inorganic solid electrolyte layer SE.

In step A5, which is performed after step A4, a positive electrode collector PC is pressure-bonded to the positive electrode active material layer PA.

As described above, the insulating material may be applied onto the negative electrode collector. Alternatively, the stacking order may be reversed. That is, an insulating material is applied onto a positive electrode collector, and a positive electrode active material layer, an inorganic solid electrolyte layer, a negative electrode active material layer, and a negative electrode collector may be then stacked in this order.

The width or the height of the insulating material to be applied in step A1 and the width of the slit die used in each of steps A2 to A4 may be appropriately changed or determined according to the form and disposition of the insulating material.

The positive electrode collector PC may be provided with a positive electrode terminal. The negative electrode collector NC may be provided with a negative electrode terminal.

Embodiment 2

Embodiment 2 will now be described, but the explanation duplicated with Embodiment 1 is appropriately omitted.

Figure 8:
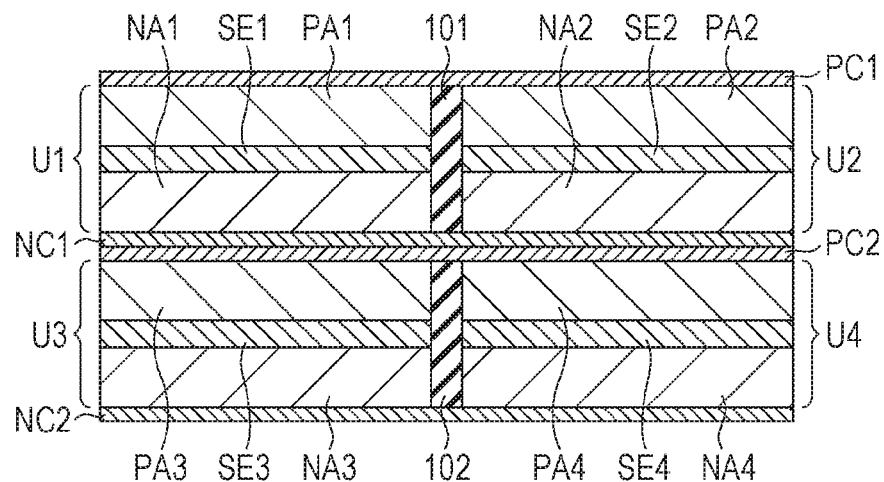
FIG. 8 is a diagram illustrating the schematic configuration of a battery according to Embodiment 2.

FIG. 8 is a diagram illustrating the schematic configuration of a battery 2000 according to Embodiment 2.

The battery 2000 in Embodiment 2 has a configuration including a plurality of power generating devices, having the same configuration as that in the battery 1000 of Embodiment 1, stacked in a bipolar arrangement.

The number of the stacked power generating devices can be appropriately determined according to the use of the battery. FIG. 8 shows a stack of two layers, as an example.

The battery 2000 according to Embodiment 2 includes a first positive electrode collector PC1, a second positive electrode collector PC2, a first negative electrode collector NC1, a second negative electrode collector NC2, a first power generating element U1, a second power generating element U2, a third power generating element U3, a fourth power generating element U4, a first insulating part 101, and a second insulating part 102.

The first power generating element U1 includes a positive electrode active material layer PA1, a negative electrode active material layer NA1, and an inorganic solid electrolyte layer SE1.

In the first power generating element U1, the inorganic solid electrolyte layer SE1 is in contact with the positive electrode active material layer PA1 and the negative electrode active material layer NA1.

The second power generating element U2 includes a positive electrode active material layer PA2, a negative electrode active material layer NA2, and an inorganic solid electrolyte layer SE2.

In the second power generating element U2, the inorganic solid electrolyte layer SE2 is in contact with the positive electrode active material layer PA2 and the negative electrode active material layer NA2.

The third power generating element U3 includes a positive electrode active material layer PA3, a negative electrode active material layer NA3, and an inorganic solid electrolyte layer SE3.

In the third power generating element U3, the inorganic solid electrolyte layer SE3 is in contact with the positive electrode active material layer PA3 and the negative electrode active material layer NA3.

The fourth power generating element U4 includes a positive electrode active material layer PA4, a negative electrode active material layer NA4, and an inorganic solid electrolyte layer SE4.

In the fourth power generating element U4, the inorganic solid electrolyte layer SE4 is in contact with the positive electrode active material layer PA4 and the negative electrode active material layer NA4.

The positive electrode active material layer PA1 of the first power generating element U1 and the positive electrode active material layer PA2 of the second power generating element U2 are in contact with the first positive electrode collector PC1.

The negative electrode active material layer NA1 of the first power generating element U1 and the negative electrode active material layer NA2 of the second power generating element U2 are in contact with the first negative electrode collector NC1.

The positive electrode active material layer PA3 of the third power generating element U3 and the positive electrode active material layer PA4 of the fourth power generating element U4 are in contact with the second positive electrode collector PC2.

The negative electrode active material layer NA3 of the third power generating element U3 and the negative electrode active material layer NA4 of the fourth power generating element U4 are in contact with the second negative electrode collector NC2.

The first negative electrode collector NC1 and the second positive electrode collector PC2 are in contact with each other.

The first insulating part 101 is disposed between the first power generating element U1 and the second power generating element U2.

The second insulating part 102 is disposed between the third power generating element U3 and the fourth power generating element U4.

In the configuration described above, even if a damage occurs in one power generating element, other power generating elements can maintain the power generating function. Consequently, the reduction in the characteristics of a battery and the loss of the power generating function can be prevented, even if a part of the power generating elements is damaged. As a result, a battery having a long service life and high reliability can be achieved.

The details of the advantageous effects will now be described with reference to a comparative example.

Figure 9:
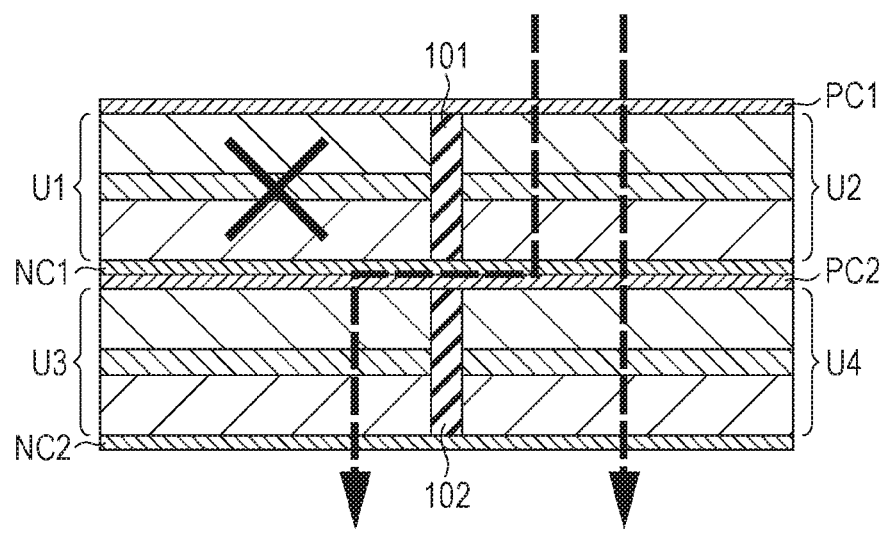
FIG. 9 is a diagram illustrating occurrence of a damage in a power generating element of the battery according to Embodiment 2.

FIG. 9 is a diagram illustrating occurrence of a damage in a power generating element of the battery 2000 according to Embodiment 2.

In the example shown in FIG. 9, the first power generating element U1 has a damage. In the first power generating element U1, therefore, the flow of ions or electric current is blocked.

In the battery 2000 of Embodiment 2, the third power generating element U3 is electrically connected to the second power generating element U2 through the first negative electrode collector NC1 and the second positive electrode collector PC2.

Therefore, as shown in FIG. 9, even if a damage occurred in the first power generating element U1, the power generating element of the third power generating element U3 connected in series with the first power generating element U1 does not lose its power generating function.

Similarly, even if a damage occurred in any of the second power generating element U2, the third power generating element U3, and the fourth power generating element U4, other power generating elements can maintain their power generating function.

Figure 10:
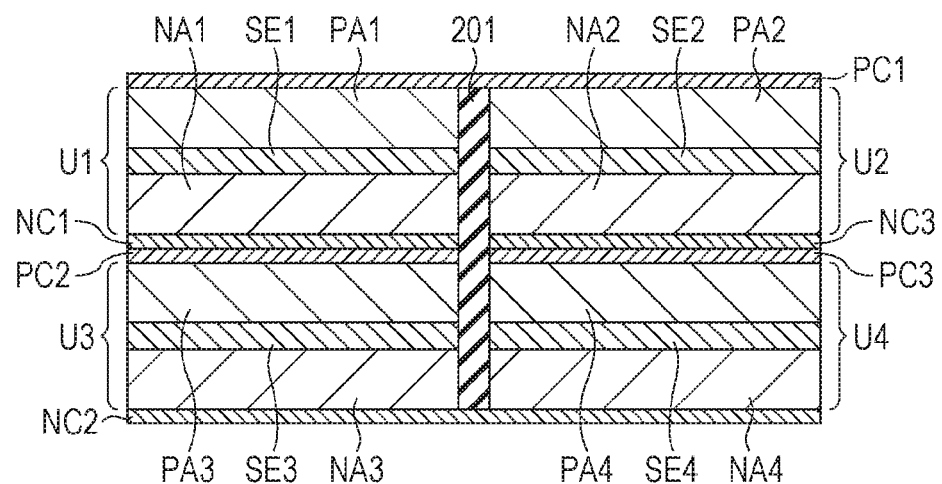
FIG. 10 is a diagram illustrating the schematic configuration of a comparative example, battery.

FIG. 10 is a diagram illustrating the schematic configuration of a comparative example, battery 2100.

The comparative example battery 2100 includes a third positive electrode collector PC3, a third negative electrode collector NC3, and an insulating part 201.

Unlike the battery 2000 of Embodiment 2, in the comparative example battery 2100, the negative electrode active material layer NA2 of the second power generating element U2 is not in contact with the first negative electrode collector NC1.

In the comparative example battery 2100, the negative electrode active material layer NA2 of the second power generating element U2 is in contact with the third negative electrode collector NC3.

Unlike the battery 2000 of Embodiment 2, in the comparative example battery 2100, the positive electrode active material layer PA4 of the fourth power generating element U4 is not in contact with the second positive electrode collector PC2.

In the comparative example battery 2100, the positive electrode active material layer PA4 of the fourth power generating element U4 is in contact with the third positive electrode collector PC3.

The third positive electrode collector PC3 and the third negative electrode collector NC3 are in contact with each other.

The insulating part 201 is disposed so as to be between the third positive electrode collector PC3 and the third negative electrode collector NC3 and between the first negative electrode collector NC1 and the second positive electrode collector PC2.

The third positive electrode collector PC3 is therefore not in contact with the first negative electrode collector NC1 and the second positive electrode collector PC2.

Similarly, the third negative electrode collector NC3 is not in contact with the first negative electrode collector NC1 and the second positive electrode collector PC2.

Figure 11:
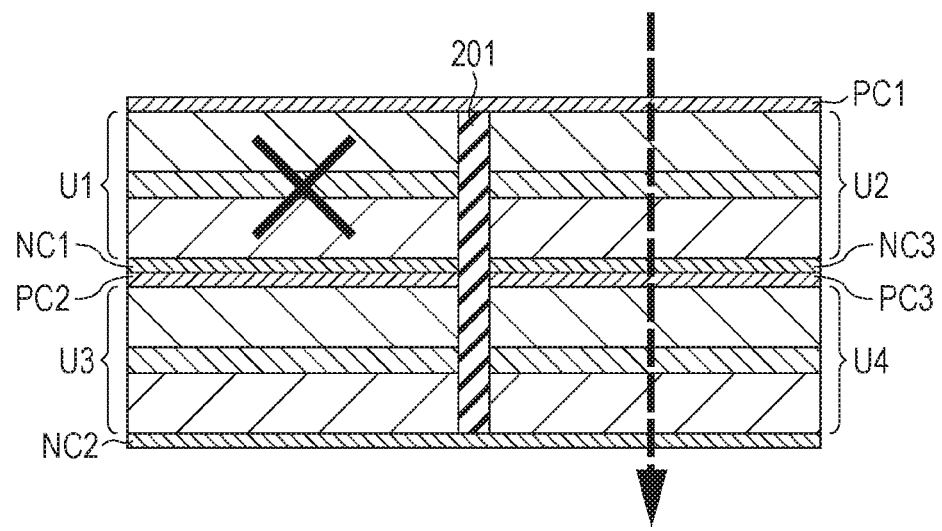
FIG. 11 is a diagram illustrating occurrence of a damage in a power generating element of the comparative example, battery.

FIG. 11 is a diagram illustrating occurrence of a damage in a power generating element of the comparative example, battery 2100.

In the example shown in FIG. 11, the first power generating element U1 has a damage. In the first power generating element U1, therefore, the flow of ions or electric current is blocked.

In the comparative example battery 2100, the third power generating element U3 is not electrically connected to the second power generating element U2.

Therefore, as shown in FIG. 11, when a damage occurred in the first power generating element U1, the power generating element of the third power generating element U3 connected in series with the first power generating element U1 loses its power generating function.

As described above, unlike the comparative example, in the configuration of Embodiment 2, even if a damage occurred in one power generating element, the power generating function of other power generating elements can be maintained.

A bipolar stacked all-solid-state lithium secondary battery may be formed by the battery 2000 of Embodiment 2.

The term "bipolar stacked" refers to a configuration including a bipolar electrode as a component and two or more power generating elements connected in series.

The bipolar electrode has a positive electrode active material layer on one surface of a current collector and a negative electrode active material layer on the other side of the current collector.

The current collector used in the bipolar electrode may be common to the positive electrode and the negative electrode or may be different in the positive electrode and the negative electrode.

The bipolar stacked all-solid-state lithium secondary battery includes a plurality of power generating elements connected in series in a single outer package and thereby can increase the volume energy density compared to ordinary all-solid-state lithium secondary batteries each including a single power generating element in an outer package.

The stacked power generating devices may differ from one another in the configuration (for example, the number of the power generating elements and the position and direction of the insulating part).

Alternatively, the stacked power generating devices may have the same configurations. In such a case, the manufacturing is easy, and the manufacturing cost can be reduced.

The number of the stacked power generating devices may be two, for example, in an all-solid-state lithium secondary battery for a small-size electronic apparatus, such as a digital camera. Alternatively, the number of the stacked power generating devices may be three to four, for example, in an all-solid-state lithium secondary battery as a power source for the system controller of an automobile. Furthermore, the number of the stacked power generating devices may be 4 to 200 in an all-solid-state lithium secondary battery as a power source for a large mobile apparatus, such as an electric vehicle.

Method of Production

An example of a method for producing a battery according to Embodiment 2 will now be described.

Figure 12:
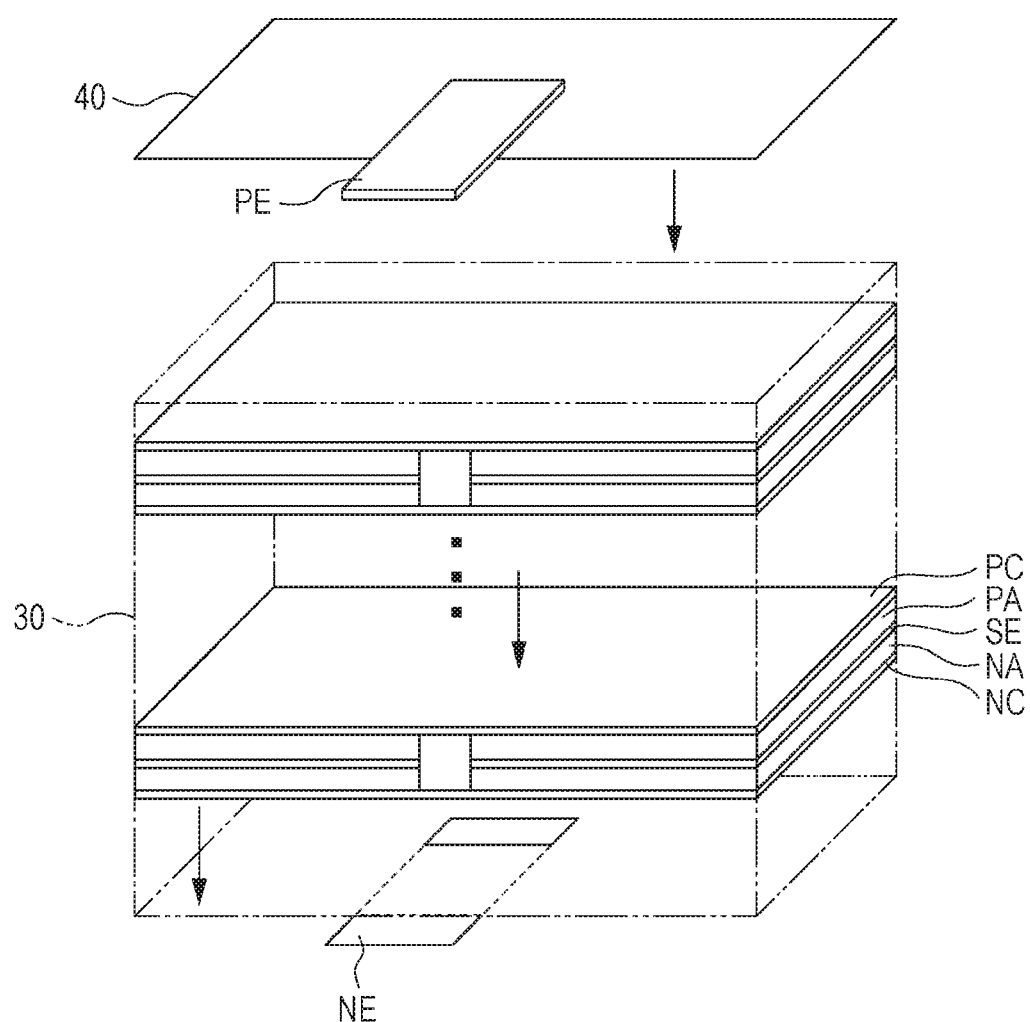
FIG. 12 is a diagram illustrating a method for producing a battery according to Embodiment 2.

FIG. 12 is a diagram illustrating a method for producing a battery according to Embodiment 2.

The method for producing a battery according to Embodiment 2 includes steps B1, B2, B3, and B4.

Step B1 produces a plurality of power generating devices by the method of production described in Embodiment 1. On this occasion, the areas of the power generating devices may be the same.

In step B2, which is performed after step B1, the first power generating device is inserted into an outer case 30 such that the negative electrode collector NC of the first power generating device is in contact with the negative electrode terminal NE.

In step B3, which is performed after step B2, power generating devices are sequentially stacked in the outer case 30 such that the negative electrode collector NC of the upper power generating device is in contact with the positive electrode collector PC of the lower power generating device.

In step B4, which is performed after step B3, the outer case 30 is sealed with a lid 40 of the outer case 30 having a positive electrode terminal PE such that the uppermost positive electrode collector PC is in contact with the positive electrode terminal PE.

As described above, the battery may be produced such that the negative electrode collector is disposed at the bottom. Alternatively, the order of the stacking may be reversed. That is, the power generating devices may be sequentially stacked in an outer case provided with a positive electrode terminal PE in advance such that a positive electrode collector PC is disposed at the bottom.

Embodiment 3

Embodiment 3 will now be described, but the explanation duplicated with Embodiment 1 or 2 is appropriately omitted.

Figure 13:
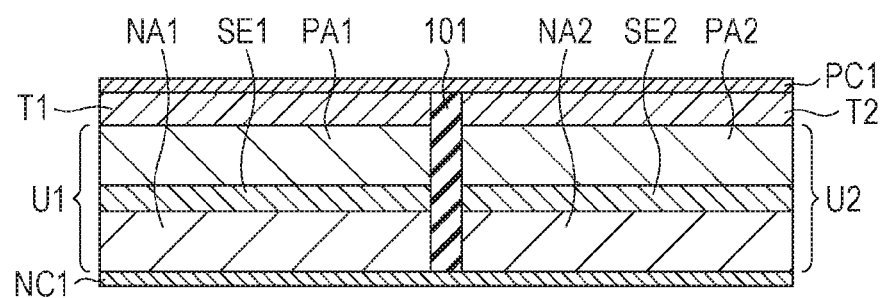
FIG. 13 is a diagram illustrating the schematic configuration of a battery according to Embodiment 3.

FIG. 13 is a diagram illustrating the schematic configuration of a battery 3000 according to Embodiment 3.

The battery according to Embodiment 3 further includes the following configuration, in addition to the configuration shown in Embodiment 1.

That is, in the battery of Embodiment 3, at least one of the first positive electrode collector PC1 and the first negative electrode collector NC1 includes a first continuity control layer T1 and a second continuity control layer T2.

The electrical resistance of the first continuity control layer T1 increases with the temperature increase. For example, the electrical resistance of the first continuity control layer T1 is increased by heat abnormally generated in the first power generating element U1.

The electrical resistance of the second continuity control layer T2 increases with the temperature increase. For example, the electrical resistance of the second continuity control layer T2 is increased by heat abnormally generated in the second power generating element U2.

The first continuity control layer T1 is disposed on the side where the first power generating element U1 is located.

The second continuity control layer T2 is disposed on the side where the second power generating element U2 is located.

The configuration described above can achieve the following advantageous effects.

For example, if a shock or vibration applied to the battery 1000 according to Embodiment 1 damages a part of the power generating elements and mixes the positive electrode mixture layer and the negative electrode mixture layer to cause an internal short-circuit, the resistance of the damaged power generating element is significantly decreased by the internal short-circuit, and the electrical current is concentrated. As a result, no electrical current flows in undamaged power generating elements, and the voltage is thereby reduced. Consequently, the voltage of the battery may be reduced to a level lower than the voltage necessary for operating the device or system that is driven by the battery. As a result, the operation of the device or system may stop.

In the battery according to Embodiment 3, however, the resistance of the continuity control layer disposed between the power generating element and the current collector is significantly increased by the Joule heat generated by the concentration of a current caused by an internal short-circuit in a part of the power generating elements. As a result, the flow of electrical current into the damaged power generating element is blocked, and the current flows into undamaged power generating elements. That is, although the voltage is temporarily decreased by the concentration of a current in the damaged power generating element at immediately after the internal short-circuit, the voltage recovers to the initial level by the work of the continuity control layer. Consequently, even if a power generating element is damaged, the device or system driven by the battery is continuously operated.

In batteries connected in parallel, since the battery containing a damaged power generating element can be prevented from power generation failure, the load is not concentrated in the battery connected in parallel to the battery containing the damaged power generating element.

The first continuity control layer T1 and the second continuity control layer T2 may be constituted as, for example, positive temperature coefficient (PTC) devices. In such a case, the electrical resistances of the first continuity control layer T1 and the second continuity control layer T2 are each increased at a prescribed temperature or more.

Alternatively, the first continuity control layer T1 and the second continuity control layer T2 may be constituted as, for example, thermal fuses. In such a case, the continuity of a current is blocked in each of the first continuity control layer T1 and the second continuity control layer T2 at a prescribed temperature or more (for example, the continuity control layer is partially molten at a prescribed temperature or more and is thereby irreversibly insulated).

The first continuity control layer T1 and the second continuity control layer T2 can have generally known configurations and can be made of generally known materials. For example, the first continuity control layer T1 and the second continuity control layer T2 can be each made by dispersing a conductive material (e.g., a metal or carbon) in a polymer (e.g., polypropylene or polyethylene).

In the battery 3000 shown in FIG. 13, the first positive electrode collector PC1 includes a first continuity control layer T1 and a second continuity control layer T2.

In the battery 3000 shown in FIG. 13, the first continuity control layer T1 is in contact with the first power generating element U1 (e.g., the positive electrode active material layer PA1), and the second continuity control layer T2 is in contact with the second power generating element U2 (e.g., the positive electrode active material layer PA2).

Figure 14:
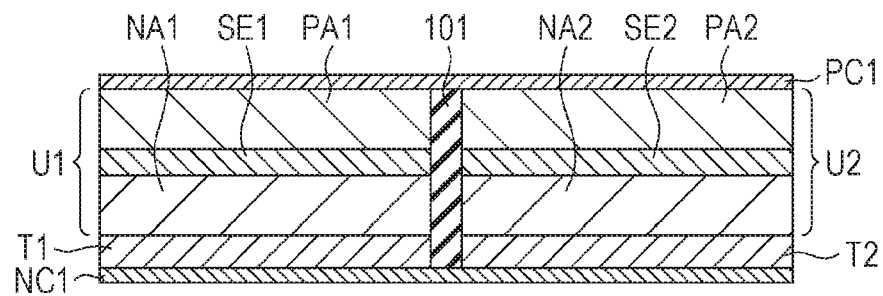
FIG. 14 is a diagram illustrating the schematic configuration of a modification example, battery, according to Embodiment 3.

FIG. 14 is a diagram illustrating the schematic configuration of a modification example, battery 3100, according to Embodiment 3.

In the battery 3100 shown in FIG. 14, the first negative electrode collector NC1 includes a first continuity control layer T1 and a second continuity control layer T2.

In the battery 3100 shown in FIG. 14, the first continuity control layer T1 is in contact with the first power generating element U1 (e.g., the negative electrode active material layer NA1), and the second continuity control layer T2 is in contact with the second power generating element U2 (e.g., the negative electrode active material layer NA2).

In Embodiment 3, the first continuity control layer T1 and the second continuity control layer T2 may be separated from each other with a first insulating part 101.

That is, the first insulating part 101 may be disposed between the first continuity control layer T1 and the second continuity control layer T2.

The configuration described above can prevent malfunction of the first continuity control layer T1 or the second continuity control layer T2. That is, the first insulating part 101 can prevent the heat generated by a damage of the first power generating element U1 from penetrating to the second continuity control layer T2. Consequently, the second continuity control layer T2 can be prevented from malfunctioning due to the heat generated by the damage of the first power generating element U1. Similarly, the first insulating part 101 can prevent the heat generated by a damage of the second power generating element U2 from penetrating to the first continuity control layer T1. Consequently, the first continuity control layer T1 can be prevented form malfunctioning due to the heat generated by the damage of the second power generating element U2.

Method of Production

An example of a method for producing a battery according to Embodiment 3 will now be described.

A method for producing a battery having the configuration shown in FIG. 13 will now be described. This method for producing the battery according to Embodiment 3 includes step X1 in addition to steps A1 to A5 described in Embodiment 1.

In step X1, which is performed after step A4, a first continuity control layer T1 and a second continuity control layer T2 are formed on a positive electrode active material layer PA. For example, the first continuity control layer T1 and the second continuity control layer T2 are applied in a strip form. The width of each strip is adjusted to that of the underlying positive electrode active material layer PA.

In this case, in step A5, a positive electrode collector PC is pressure-bonded onto the first continuity control layer T1 and the second continuity control layer T2, after step X1.

A method for producing a battery having the configuration shown in FIG. 14 will now be described. This method for producing the battery according to Embodiment 3 includes step X2 in addition to steps A1 to A5 described in Embodiment 1.

In step X2, which is performed after step A1, a first continuity control layer T1 and a second continuity control layer T2 are formed on a negative electrode collector NC. For example, the first continuity control layer T1 and the second continuity control layer T2 are formed in a strip form.

In this case, in step A2, which is performed after step X2, a negative electrode active material layer NA is formed on the first continuity control layer T1 and the second continuity control layer T2.

As described above, the insulating material may be applied onto the negative electrode collector. Alternatively, the order of the stacking may be reversed. That is, an insulating material is applied onto a positive electrode collector, and a continuity control layer, a positive electrode active material layer, an inorganic solid electrolyte layer, a negative electrode active material layer, and a negative electrode collector may be then stacked in this order. Alternatively, an insulating material is applied onto a positive electrode collector, and a positive electrode active material layer, an inorganic solid electrolyte layer, a negative electrode active material layer, a continuity control layer, and a negative electrode collector may be then stacked in this order.

Embodiment 4

Embodiment 4 will now be described, but the explanation duplicated with any of Embodiments 1 to 3 is appropriately omitted.

Figure 15:
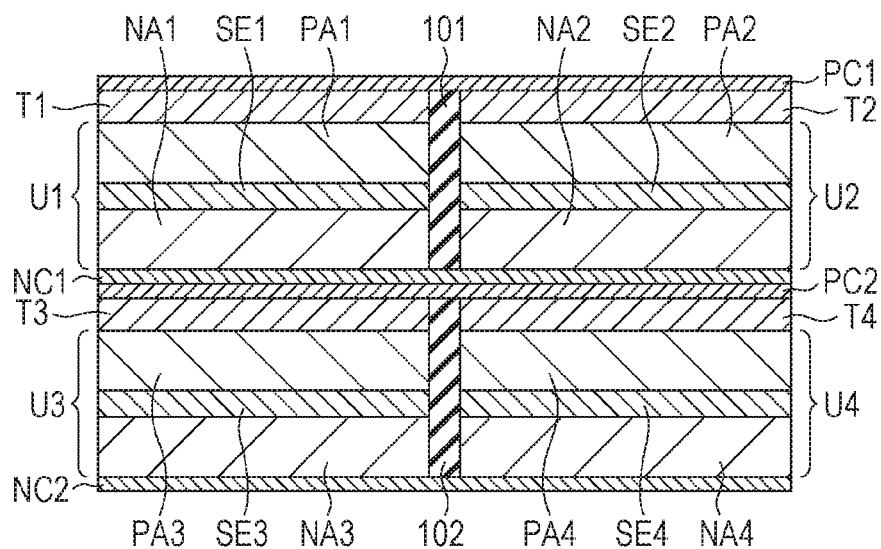
FIG. 15 is a diagram illustrating the schematic configuration of a battery according to Embodiment 4.

FIG. 15 is a diagram illustrating the schematic configuration of a battery 4000 according to Embodiment 4.

The battery in Embodiment 4 has a configuration including a plurality of power generating devices having the same configuration as that described in Embodiment 3 and stacked in a bipolar arrangement.

The number of the stacked power generating devices can be appropriately determined depending on the use of the battery. FIG. 15 shows a stack of two layers, as an example.

The battery in Embodiment 4 further includes the following configuration in addition to the configuration shown in Embodiment 3.

That is, the battery according to Embodiment 4 further includes a second positive electrode collector PC2, a second negative electrode collector NC2, a third power generating element U3, a fourth power generating element U4, and a second insulating part 102.

The second positive electrode collector PC2, the second negative electrode collector NC2, the third power generating element U3, and the fourth power generating element U4 can be in the same configurations as those shown in Embodiment 2.

In the battery of Embodiment 4, at least one of the second positive electrode collector PC2 and the second negative electrode collector NC2 includes a third continuity control layer T3 and a fourth continuity control layer T4.

The electrical resistance of the third continuity control layer T3 increases with the temperature increase. For example, the electrical resistance of the third continuity control layer T3 is increased by heat abnormally generated in the third power generating element U3.

The electrical resistance of the fourth continuity control layer T4 increases with the temperature increase. For example, the electrical resistance of the fourth continuity control layer T4 is increased by heat abnormally generated in the fourth power generating element U4.

The third continuity control layer T3 is disposed on the side where the third power generating element U3 is located.

The fourth continuity control layer T4 is disposed on the side where the fourth power generating element U4 is located.

The configuration described above can achieve the following advantageous effects.

In the battery according to Embodiment 4, if an internal short-circuit occurs in a part of the power generating elements to cause concentration of a current, the continuity control layer functions to allow the current to flow into undamaged power generating elements. Although the voltage is temporarily decreased by the concentration of a current in the damaged power generating element at immediately after the internal short-circuit, the voltage recovers to the initial level by the work of the continuity control layer. Consequently, even if a power generating element is damaged, the device or system driven by the battery is continuously operated.

In batteries connected in parallel, since the battery containing a damaged power generating element can be prevented from power generation failure, the load is not concentrated in the battery connected in parallel to the battery containing the damaged power generating element.

The third continuity control layer T3 and the fourth continuity control layer T4 can have the same configurations as those of the continuity control layers shown in Embodiment 3 and can be made of the same materials as those of the continuity control layers shown in Embodiment 3.

In the battery 4000 shown in FIG. 15, the second positive electrode collector PC2 includes a third continuity control layer T3 and a fourth continuity control layer T4.

In the battery 4000 shown in FIG. 15, the third continuity control layer T3 is in contact with the third power generating element U3 (e.g., the positive electrode active material layer PA3), and the fourth continuity control layer T4 is in contact with the fourth power generating element U4 (e.g., the positive electrode active material layer PA4).

Figure 16:
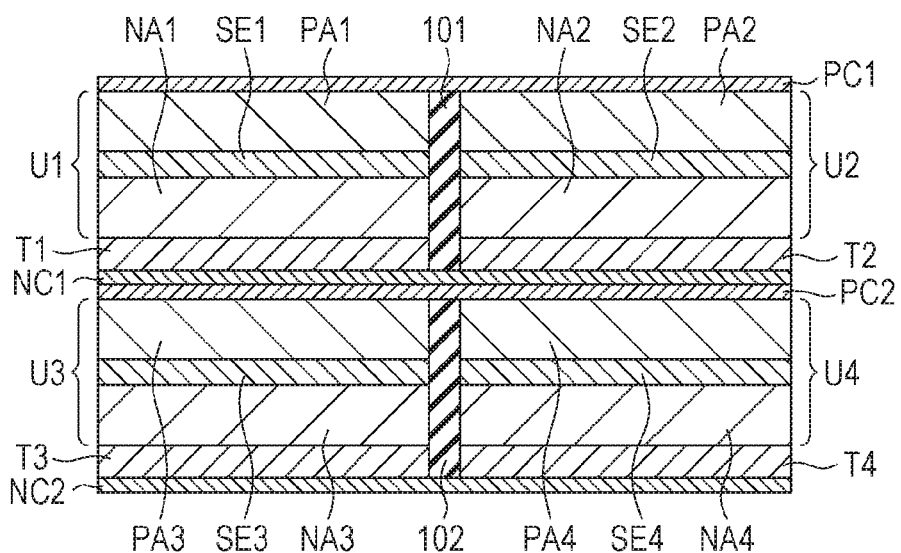
FIG. 16 is a diagram illustrating the schematic configuration of a modification example, battery, according to Embodiment 4.

FIG. 16 is a diagram illustrating the schematic configuration of a modification example, battery 4100, according to Embodiment 4.

In the battery 4100 shown in FIG. 16, the second negative electrode collector NC2 includes a third continuity control layer T3 and a fourth continuity control layer T4.

In the battery 4100 shown in FIG. 16, the third continuity control layer T3 is in contact with the third power generating element U3 (e.g., the negative electrode active material layer NA3), and the fourth continuity control layer T4 is in contact with the fourth power generating element U4 (e.g., negative electrode active material layer NA4).

In Embodiment 4, the third continuity control layer T3 and the fourth continuity control layer T4 may be separated from each other with a second insulating part 102.

That is, the second insulating part 102 may be disposed between the third continuity control layer T3 and the fourth continuity control layer T4.

The configuration described above can prevent malfunction of the third continuity control layer T3 or the fourth continuity control layer T4. That is, the second insulating part 102 can prevent the heat generated by a damage of the third power generating element U3 from penetrating to the fourth continuity control layer T4. Consequently, malfunction of the fourth continuity control layer T4 due to the heat generated by the damage of the third power generating element U3 can be prevented. Similarly, the second insulating part 102 can prevent the heat generated by a damage of the fourth power generating element U4 from penetrating to the third continuity control layer T3. Consequently, malfunction of the third continuity control layer T3 due to the heat generated by the damage of the fourth power generating element U4 can be prevented.

Method of Production

An example of a method for producing a battery according to Embodiment 4 will now be described.

A method for producing a battery having the configuration shown in FIG. 15 will now be described. This method for producing the battery according to Embodiment 4 includes step Y1 in addition to steps B2 to B4 described in Embodiment 2.

Step Y1 produces a plurality of power generating devices by the method including step X1 described in Embodiment 3. On this occasion, the areas of the power generating devices may be the same.

In this case, step B2 is performed after step Y1.

A method for producing a battery having the configuration shown in FIG. 16 will now be described. This method for producing the battery according to Embodiment 4 includes step Y2 in addition to steps B2 to B4 described in Embodiment 2.

Step Y2 produces a plurality of power generating devices by the method including step X2 described in Embodiment 3. On this occasion, the areas of the power generating devices may be the same.

In this case, step B2 is performed after step Y2.

As described above, the battery may be produced such that the negative electrode collector is disposed at the bottom. Alternatively, the order of the stacking may be reversed. That is, the power generating devices may be sequentially stacked in an outer case provided with a positive electrode terminal PE in advance such that a positive electrode collector PC is disposed at the bottom.

Embodiment 5

Embodiment 5 will now be described, but the explanation duplicated with any of Embodiments 1 to 4 is appropriately omitted.

Figure 17:
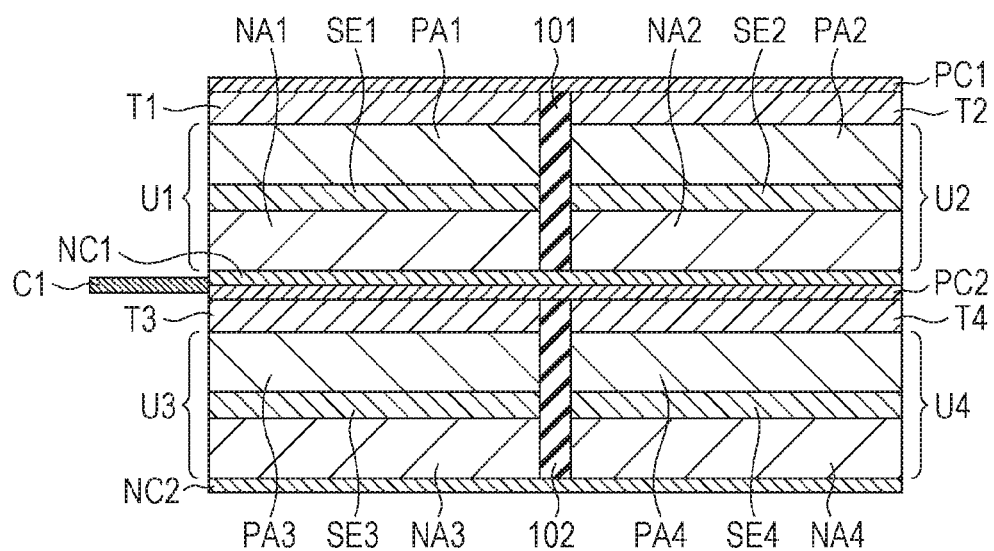
FIG. 17 is a diagram illustrating the schematic configuration of a battery according to Embodiment 5.

FIG. 17 is a diagram illustrating the schematic configuration of a battery 5000 according to Embodiment 5.

The battery 5000 in Embodiment 5 further includes the following configuration in addition to the configuration shown in Embodiment 4.

That is, the battery 5000 according to Embodiment 5 further includes a first voltage detection terminal C1.

The first voltage detection terminal C1 is in contact with the first negative electrode collector NC1 or the second positive electrode collector PC2.

The configuration described above can achieve the following advantageous effects.

In the configuration of the battery shown in Embodiment 4, the occurrence of an internal short-circuit can be detected based on the voltage between the first positive electrode collector PC1 and the second negative electrode collector NC2, which is output as the battery voltage, but the place of the occurrence of internal short-circuit cannot be specified.

In the configuration of the battery according to Embodiment 5, the occurrence of an internal short-circuit and also the layer having the internal short-circuit can be detected by monitoring not only the battery voltage but also the voltage between the first positive electrode collector PC1 and the first voltage detection terminal C1 or between the second negative electrode collector NC2 and the first voltage detection terminal C1 with a voltage detector.

The identification of the position of the internal short-circuit can verify the degree of the damage more precisely.

A method for installing voltage detectors will now be described in more detail.

When the number of the layers stacked in a bipolar arrangement is n (n: natural number), the number of the voltage detectors is n−1.

The voltage detectors connect between adjacent voltage detection terminals, between first positive electrode collector and the first voltage detection terminal, and between the n'th negative electrode collector and the (n−1)'th voltage detection terminal. As a result, the layer having an internal short-circuit can be identified.

Figure 18:
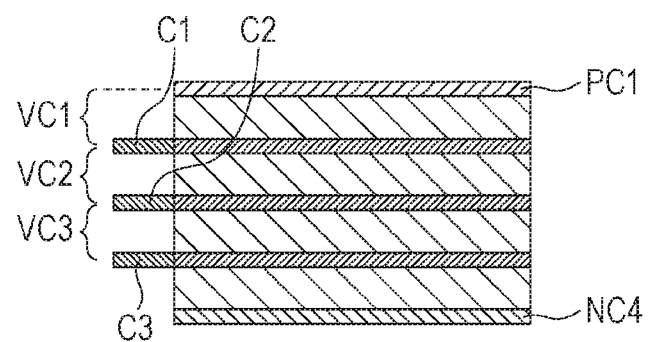
FIG. 18 is a diagram illustrating the schematic configuration of a battery including four layers stacked in a bipolar arrangement.

FIG. 18 is a diagram illustrating the schematic configuration of a battery including four layers stacked in a bipolar arrangement.

The method for installing voltage detectors will be more specifically described with reference to FIG. 18.

The layer including the power generating element being in contact with the first positive electrode collector PC1 is defined as the first layer.

The layer including the power generating element being in contact with the fourth negative electrode collector NC4 is defined as the fourth layer.

A first voltage detector VC1 detecting the voltage between the first positive electrode collector PC1 and the first voltage detection terminal C1 is installed.

A second voltage detector VC2 detecting the voltage between the first voltage detection terminal C1 and the second voltage detection terminal C2 is installed.

A third voltage detector VC3 detecting the voltage between the second voltage detection terminal C2 and the third voltage detection terminal C3 is installed.

A case of having occurrence of internal short-circuits in the first and fourth layers will now be described as an example.

The voltage per each layer is temporarily defined to be 4 V. On this occasion, the voltage decreases to about 0 V due to the internal short-circuits in the first and fourth layers. The voltage then recovers to 4 V by the work of the continuity control layer.

At immediately after the occurrence of the internal short-circuits, the voltage of the battery as a whole is 8 V, and the voltages detected by the first voltage detector VC1, the second voltage detector VC2, and the third voltage detector VC3 are respectively 0 V, 4 V, and 4 V.

The information on the voltage of the battery as a whole demonstrates that the number of the layers having internal short-circuits is two.

The information from the first voltage detector VC1 demonstrates that the first layer has an internal short-circuit.

The information on the voltage of the battery as a whole and the information from the first voltage detector VC1, second voltage detector VC2, and third voltage detector VC3 demonstrate that the fourth layer has an internal short-circuit.

Thus, the layer having an internal short-circuit can be detected by installing (n−1) voltage detectors.

The battery of the present disclosure can be used as, for example, an all-solid-state lithium secondary battery.

While the present disclosure has been described with respect to exemplary embodiments thereof, it will be apparent to those skilled in the art that the disclosure may be modified in numerous ways and may assume many embodiments other than those specifically described above. Accordingly, it is intended by the appended claims to cover all modifications of the disclosure that fall within the true spirit and scope of the disclosure.

What is claimed is:

1. A battery comprising:
   a first positive electrode collector;
   a first negative electrode collector;
   a first power generating element;
   a second power generating element;
   a first insulating part;
   a first continuity control layer in which an electrical resistance increases with temperature;
   a second continuity control layer in which an electrical resistance increases with temperature;
   a second positive electrode collector;
   a second negative electrode collector;
   a third power generating element;
   a fourth power generating element; and
   a second insulating part, wherein
   the first power generating element and the second power generating element each include a positive electrode active material layer containing a positive electrode active material, a negative electrode active material layer containing a negative electrode active material, and an inorganic solid electrolyte layer containing an inorganic solid electrolyte;
   the inorganic solid electrolyte layer in the first power generating element is in contact with the positive electrode active material layer and the negative electrode active material layer in the first power generating element;
   the inorganic solid electrolyte layer in the second power generating element is in contact with the positive electrode active material layer and the negative electrode active material layer in the second power generating element;
   the positive electrode active material layer of the first power generating element and the positive electrode active material layer of the second power generating element are electrically connected with the first positive electrode collector;
   the negative electrode active material layer of the first power generating element and the negative electrode active material layer of the second power generating element are electrically connected with the first negative electrode collector;

the first insulating part is disposed between the first power generating element and the second power generating element;

the third power generating element and the fourth power generating element each include a positive electrode active material layer containing a positive electrode active material, a negative electrode active material layer containing a negative electrode active material, and an inorganic solid electrolyte layer containing an inorganic solid electrolyte;

the inorganic solid electrolyte layer in the third power generating element is in contact with the positive electrode active material layer and the negative electrode active material layer in the third power generating element;

the inorganic solid electrolyte layer in the fourth power generating element is in contact with the positive electrode active material layer and the negative electrode active material layer in the fourth power generating element;

the positive electrode active material layer of the third power generating element and the positive electrode active material layer of the fourth power generating element are in contact with the second positive electrode collector;

the negative electrode active material layer of the third power generating element and the negative electrode active material layer of the fourth power generating element are in contact with the second negative electrode collector;

the first negative electrode collector is in direct contact with the second positive electrode collector;

the second insulating part is disposed between the third power generating element and the fourth power generating element, the first continuity control layer is between the first negative electrode collector and the first power generating element or between the first positive electrode collector and the first power generating element; and the second continuity control layer is between the first negative electrode collector and the second power generating element or between the first positive electrode collector and the second power generating element.

2. The battery according to claim 1, wherein the first insulating part has a width of 1 to 10000 μm.

3. The battery according to claim 1, wherein the first insulating part has a Young's modulus of 20 GPa or less.

4. The battery according to claim 1, wherein the first continuity control layer and the second continuity control layer are separated by the first insulating part.

5. The battery according to claim 1, further comprising:
a third continuity control layer in which an electrical resistance increases with temperature; and
a fourth continuity control layer in which an electrical resistance increases with temperature,
wherein the third continuity control layer is between the third power generating element and at least one of the second positive electrode collector and the second negative electrode collector; and
the fourth continuity control layer is between the fourth power generating element and at least one of the second positive electrode collector and the second negative electrode collector.

6. The battery according to claim 5, wherein the third continuity control layer and the fourth continuity control layer are separated by the second insulating part.

7. The battery according to claim 5, further comprising:
a voltage detection terminal, wherein
the voltage detection terminal is in contact with the first negative electrode collector or the second positive electrode collector.

\* \* \* \* \*